United States Patent [19]
Fredericks

[11] Patent Number: 4,795,967
[45] Date of Patent: Jan. 3, 1989

[54] LEVEL MEASURING DEVICE FOR ELECTRICALLY NON-CONDUCTIVE LIQUIDS

[75] Inventor: George E. Fredericks, Graz, Austria

[73] Assignee: A V L Gesellschaft fur Verbrennungskraftmaschinen und Messtechnik m.b.H. Prof. Dr.Dr.h.c. Hans List, Graz, Austria

[21] Appl. No.: 95,426

[22] Filed: Sep. 11, 1987

[30] Foreign Application Priority Data

Sep. 17, 1986 [AT] Austria ................... 2492/86

[51] Int. Cl.⁴ ........................................... G01R 27/26
[52] U.S. Cl. .................................. 324/61 P; 324/61 R
[58] Field of Search ........................... 324/61 R, 61 P; 340/870.37, 618, 620; 73/304 C; 361/178, 284

[56] References Cited

U.S. PATENT DOCUMENTS

| | | | |
|---|---|---|---|
| 2,700,901 | 2/1955 | Rickner | 324/61 P |
| 2,866,337 | 12/1958 | Minneman et al. | 324/61 R |
| 4,347,741 | 9/1982 | Geiger | 324/61 P |
| 4,555,661 | 11/1985 | Benson et al. | 324/61 P |

FOREIGN PATENT DOCUMENTS

| | | |
|---|---|---|
| 3322657 | 1/1985 | Fed. Rep. of Germany . |
| 2043259 | 10/1980 | United Kingdom . |

Primary Examiner—Reinhard J. Eisenzopf
Assistant Examiner—Anthony L. Miele
Attorney, Agent, or Firm—Watson Cole Grindle & Watson

[57] ABSTRACT

In a level measuring device for electrically non-conductive liquids comprising a sensor which is positioned in a vessel and is in contact with the liquid, and further comprising an evaluation circuit connected to this sensor both compensation of a changing dielectric constant and a high degree of accuracy and resolution are achieved by placing a driver electrode 5 in the lower part of the vessel 1 at a position essentially coaxial to the sensor electrode 3, 4, and by placing a compensating electrode 6 between the driver electrode 5 and the wall 8 of the vessel 1, such that further capacitors are formed between the two electrodes 5 and 6 themselves as well as between them and the sensor electrode 3, 4 and between them and the wall 8 of the vessel 1.

5 Claims, 4 Drawing Sheets

LEVEL MEASURING DEVICE FOR ELECTRICALLY NON-CONDUCTIVE LIQUIDS

BACKGROUND OF THE INVENTION

The invention relates to a level measuring device for electrically non-conductive liquides, comprising a sensor electrode which is coaxially positioned in a vessel and is partly immersed in the liquid, and which, together with the wall of the essentially vertical vessel, forms a capacitor that is connected to an evaluation circuit measuring the capacitance of this capacitor, which provides a measure for the liquid level in the vessel to be determined, taking into account a compensating electrode also lcoated in the vessel.

DESCRIPTION OF THE PRIOR ART

In German laidopen print DE-OS No. 33 22 657 a level measuring device is disclosed comprising a probe located in a vessel. This probe constitutes one of the electrodes of a capacitor whose other electrode is formed by the vessel itself. The capacitance of the capacitor, which varies with the liquid level due to the different dielectric constants of air and liquid, represents a measure for the liquid content. By means of a measuring circuit for capacitance connected to the probe the measuring signal is evaluated. Any change in the dielectric constant, however, will necessitate re-calibration of this device.

A level measuring device of the initially mentioned type, which is known from GB-A No. 2 043 259 has a compensating electrode permitting the compensation of any effects of a changing dielectric constant of the sample liquid. Such a change in dielectric constant may be caused by a temperature change in the liquid, for example. The disadvantage of this measuring device is its somewhat complicated design due to the various elements placed in the measuring vessel and its expensive electronics consisting of two circuits, one for the measuring electrode and another one for the reference electrode. the output signals of the two circuits are processed in a computer by means of approximation functions.

SUMMARY OF THE INVENTION

It is an object of the invention to propose a measuring device of the initially mentioned type which is destinguished by a very simple mechanical and electronic design while permitting a very high resolution.

According to the invention this is achieved by placing a driver electrode in the bottom area of the vessel at a position essentially coaxial to the sensor electrode, and by positioning the compensating electrode between the driver electrode and the wall of the vessel, the two electrodes constituting further capacitors in conjunction with each other, and with the sensor electrode, and with the wall of the vessel.

This will permit a very simple design of the vessel, in which all electrodes may be grouped essentially coaxially around the sensor electrode configured as a wire, and in which the evaluation circuit required for signal evaluation may be kept very simple by the use of a driver electrode. The mathematical background of this device is simpler now and does not necessitate the use of a computer.

Besides, there will be no need for calibration of the measuring device in accordance with the respective dielectric constant of the sample liquid, which means that the device can be used for different liquids without having to be re-calibrated.

In order to improve linearity between the liquid level in the vessel and the output signal of the measuring device, especially for lower levels, provision may be made for a shielding electrode above the driver and compensating electrodes, which is electrically connected to the wall of the vessel and is placed at a position normal to the sensor electrode, by which it is pierced without touching.

It is essential for a measuring device according to the invention that the evaluation circuit be most sensitive even to minute changes in capacitance which it must be able to register.

In a level measuring device according to the invention, comprising an evaluation circuit as described, for instance, in AT-PS No. 367 211, which is configured as a capacitive measuring transformer whose capacitance, which is formed by the sensor electrode and the wall of the vessel, is part of a capacitive bridge, and in which the connecting points of each pair of capacitors forming a bridge arm are connected to an amplifier each, whose outputs in turn are connected to a differential amplifier a circuit element, for example a diode or a transistor, being series-connected to each of the two bridge arms, and the two circuit elements being inter-connected with each other and connected to an auxiliary voltage source on one side, and at least one of these circuit elements being connected to both the bridge arm and, via passive current-limiting elements, of an output of the differential amplifier on its other side, whereas the other side of the second circuit element is connected to the second bridge arm and, via passive current-limiting elements, to a fixed potential or a second differential output of the differential amplifier, another characteristic of the invention provides that the second capacitor of the bridge arm containing the capacitor formed by the sensor electrode and the wall of the vessel, by formed by the driver electrode of the vessel and the sensor electrode, whereas the other bridge arm be formed by fixed capacitors.

This type of capacitive measuring transducer to be used as an evaluation circuit is characterised by its great simplicity of design and its high sensitivity. In addition, the effects of the dielectric constant can be compensated in a very simple manner, as will be further explained in the description of the enclosed drawings.

The influence of the dielectric constant may be compensated particularly well if two capacitors in series are parallel-connected to the bridge arm established by the vessel and its sensor and driver electrodes, which capacitors are formed by the driver electrode and the compensating electrode, or rather, the latter and the wall of the vessel, a resistor being parallel-connected to the latter capacitor, and a compensating circuit being connected at the connecting point of the two capacitors of the series circuit and the resistor, whose output acts upon the auxiliary voltage source feeding the bridge arms and preferably supplying square-wave pulses.

In this context another feature of the invention provides that the compensating circuit should have a comparator, one of whose inputs is connected via a diode to the connecting point of the two series-connected capacitors which are parallel-connected to one of the bridge arms, with the additional use of a smoothing capacitor at this input, while the other input of the comparator is connected to a reference potential, and the output of the comparator is connected via resistors to the connecting points of the circuit elements and the bridge arms, or rather the feedback circuit between the circuit output and the bridge arms. From the point of view of circuit design this will result in a very simple configuration of the compensator unit.

The measuring device according to the invention is not only suited for measuring liquid volums, but can also be used as a flow-meter if suitable modifications are made, for instance as described in AT-PS No. 370 518. For this purpose two vessels may be connected one behind the other, and the valves regulating the flow into and out of the individual vessels may be controlled in accordance with the levels attained in the individual vessels.

DESCRIPTION OF THE DRAWINGS

Following is a more detailed description of the invention as illustrated by the attached drawings, wherein

FIG. 1 shows a vertical vessel 1 with an electrically conductive wire serving as a sensor electrode 3, which is positioned axially. This sensor electrode 3 passes through a disk sealing the bottom end of the vessel, or rather a bottom 2 of the vessel 1, which is made of insulating material. The wall 8 of the vessel may be made of any suitable material, though metal is preferred because of its stability of form and as it may be used as a shield against exterior electrical influences if the wall is grounded.

Figure 1:
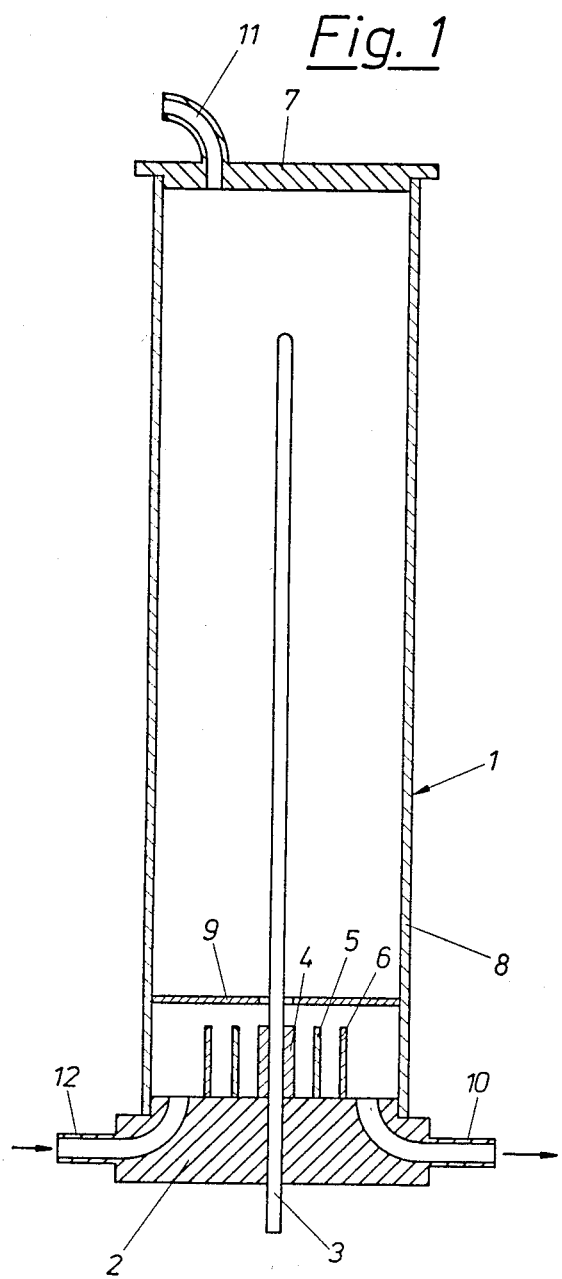
FIG. 1 shows the basic design of a measuring vessel according to the invention, FIG. 2 a state-of-the-art evaluation circuit, FIG. 3 an evaluation circuit for the vessel presented in FIG. 1, and FIG. 4 a calibration curve of a measuring device according to the invention as presented in FIG. 3.

In the bottom area, which is continuously covered by the liquid to be measured, the sensor electrode 3 is electrically connected with a cylindrical piece 4. Further provided are a driver electrode 5 and a compensating electrode 6 located between the driver electrode 5 and the wall 8 of the vessel 1, both of which electrodes ideally are configured as coaxial rings around the sensor electrode 3.

These additional electrodes 5 and 6 are covered by a shielding electrode 9 which is connected to the wall 8 of the vessel 1 and which itself is pierced by the sensor electrode 3 without being touched by it.

The bottom 2 is penetrated by a feeding pipe 12 and a draining pipe 10, and by the sensor electrode 3. In addition, the vessel 1 has a cover 7 with a vent 11.

Figure 2:
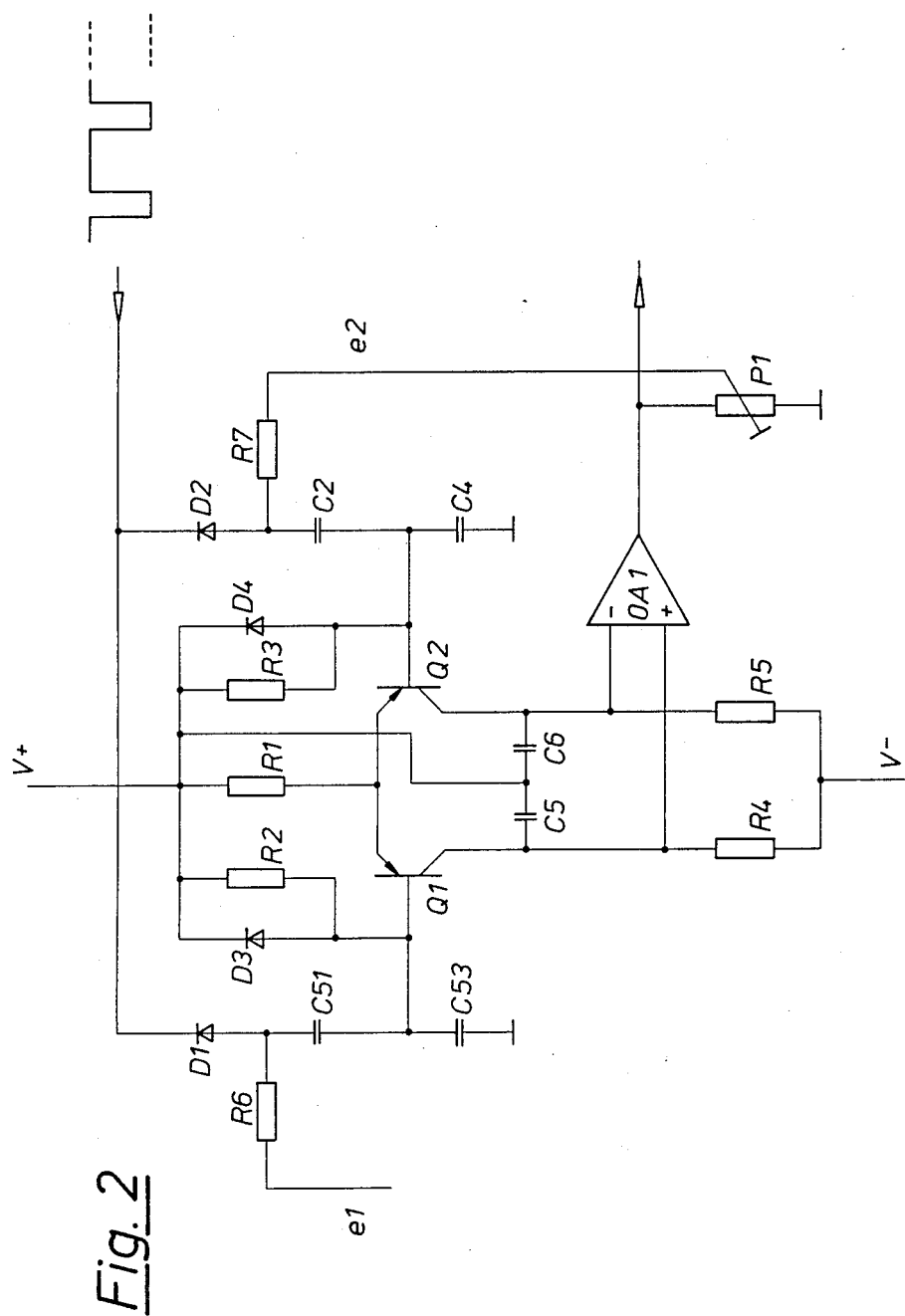

The measuring principle of a known evaluation circuit without compensation is shown in FIG. 2. Here the sensor electrode and the wall of the vessel together form a capacitor C4 whose capacitance depends on the level of the liquid in the vessel due to the differing dielectric constants of air and the liquid to be measured. If the vessel is filled with liquid up to a certain reference level, the capacitance of the capacitor C4 may be represented as the sum of two capacitances $\epsilon$ C41, C42 connected in parallel, in which case C41 represents the capacitance between the sensor electrode and the wall from the bottom up to the reference level, with air as a dielectric, while C42 is the capacitance of the sensor electrode against the wall in the remaining part of the vessel, with air as a dielectric, and $\epsilon$ is the dielectric constant of the liquid; the dielectric constant of air is assumed to be 1.

If the liquid level in the vessel changes the capacitance will also change, as the dielectric constant enters into the total capacitance of the vessel; this change in capacitance may be registered by an evaluation circuit. For this purpose two bridge arms are provided, which are formed by capacitors C51, C53 and by capacitors C2, C4, the capacitor C4 being formed by the vessel, or rather by the vessel and its sensor electrode 3, with a capacitance depending on the liquid level in the vessel 1.

The capacitors C53 and C4 are connected to a fixed potential, for instance ground, on one end. The other two ends of the two bridge arms are connected to a potential e1 via a resistor R6, and to a potential e2 via a resistor R7, the potential e2 being derived from the output voltage of the evaluation circuit via the potentiometer P1 to provide feedback. Besides, these ends of the bridge arms are connected via the diodes D1 and D2 to an auxiliary voltage source not shown, which provides a pulse train consisting of square-wave pulses.

The connecting pints of the capacitors C52, C51 and C2, C4 forming the two bridge arms are connected to the bases of the two amplifier transistors Q1, Q2 which are preferably configured as an integrated pair.

These connecting points are further connected to a fixed potential V+ by means of the diodes D3, D4 and the resistors R2, R3 parallel to these diodes. This potential is also applied to the joint emitter resistor R1 of the two transistors Q1, Q2, and furthermore to the joint connecting point of two capacitors C5, C6, which in turn are connected to the collectors of the transistors Q1, Q2 and the input terminals of the differential amplifier OA1, serving as common-mode surge limiters. The collectors of the transistors Q1, Q2 and the input terminals of the differential amplifer OA1 are furthermore connected to resistors R4, R5, which jointly connect to a fixed potential V—.

This circuit has two operational states: The first state, to be called initial state in the following, arises when the pulse input is high ("high" indicating a voltage more positive than either of the potential e1 and e2). A short time after this state has been reached there is practically no current flow into the capacitive bridge. The diodes D1, D2 are in the cut-off state. One electrode of C51 is at potential e1, and one electrode of C2 is at potential e2. The potential e2 is determined by the output voltage of the evaluation circuit and by the setting of potentiometer P1. The center points of the bridge, and thus the bases of the two transistors Q1, Q2, assume the potential V+ of one pole of a d.c. voltage source through the charging of capacitors C53 and C4 via the resistors R2 and R3, the capacitors being grounded on one side. Since the emitters of the transistors Q1, Q2 also are connected to the potential V+ via the resistor R1, the transistors Q1, Q2 are in the cut-off state, and the capacitors, C5, C6 connected to the potential V+ on one side are being charged. The second side of the circuit, in the following to be called active state, arises when the pulse input is low ("low" meaning a voltage considerably more negative than the potential e1 or e2). In this state the diodes D1, D2 are opening. The electrodes on one side of the capacitors C51, C2 drop to a potential e3; e3 being higher by the diode forward voltage than the potential at the pulse input. Because of the steep negative slope of the input pulses a relatively high current is flowing for a short time through the capacitive bridge C51, C53, C2, C4 and the bases of the two transistors Q1, Q2. These base currents result in amplified collector currents which in turn will result in a rise of potential at the electrodes of the capacitors C5, C6, which are connected to the other pole V— of the d.c. voltage source via the resistors R4, R5.

For the time being it is assumed that C51 is equal to C2, C53 is equal to C4, and e2 is equal to e1. In this case the charge flows on both sides of the bridge are equal, and the two transistors Q1, Q2 will effect equal changes in charge in the capacitors C5, C6, when they are opening as a consequence of a "LOW" signal at the pulse input.

If C53 is not equal to C4 but e2 is equal to e1, or if C53 is equal to C4 but e2 is not equal to e1, the changes in charge are unequal, and C5 and C6 are unequally charged, resulting in a change in the output voltage of the amplifier OA1. The circuit will remain in this active state only for a relatively short time, the positive slope of the input pulse returning the circuit to the initial state. The diodes D3, D4 limit the inverse emitter base voltages, and the resistors R2, R3 connected parallel to the diodes serve to eliminate the effects of possible differences in the characteristics of the diodes D3, D4 upon the result of the measurement.

Preferably, the pulse frequency should be set as high as possible, taking account of the time required by the circuit to become stable in its initial state. The resistors R4, R5 are chosen such that the inputs of the amplifier OA1 remain within its common-mode voltage range, and that the collectors of the two transistors always are at a negative voltage. The capacitors C5, C6 are chosen such that the common-mode surge after each negative input pulse will remain small.

If the amplifier OA1 has a high open-loop voltage gain—the circuit being kept stable by negative feedback from the output—, very small capacitance changes can be detected and measured.

The potential e1 may be a constant potential (zero), or may be derived from a feedback loop of the amplifier OA1, if the latter is provided with a differential output.

The diodes D1, D2 may be replaced by transistors which are jointly controlled by a pulse train applied to their bases and preferably consisting of squarewave pulses, and which alternatively establish a connection between the capacitors C2, C1, respectively, and a fixed potential, which of course must be different from either of the potentials e1 and e2.

This evaluation circuit already permits the measuring of minute changes in capacitance of the capacitor C4 consisting of the sensor electrode and the sample vessel, resulting in a high resolution and in the possibility to detect even small changes of the liquid level in the vessel.

In the known variant according to FIG. 2 either the dielectric constant of the liquid to be measured has to be known, however, or the device has to be calibrated for a particular liquid. Any changes of the dielectric constant with temperature have to be compensated by a compensating circuit, or corrected by means of a correction table.

In order to render the output signal of the evaluation circuit according to FIG. 2 independent of the dielectric constant of the liquid to be measured, the invention is based on the following considerations.

The output signal should not change with a change in dielectric constant if the liquid level in vessel 1 remains constant, and the sensitivity (dUa/dL)

should remain constant regardless of level changes. Ua designates the output voltage of the evaluation circuit, and L is the liquid level.

The evaluation circuit according to FIG. 2 has the following transfer function.

$$Ua = \frac{U-m}{b}\left[1 - n\left(1 + \frac{C4}{C2}\right)\right] \quad (1)$$

where
Ua is the output voltage relative to ground,
U is the pulse amplitude, and
b,m,n designate constant quantities.
If $$\frac{C4}{C2} = \frac{\epsilon C41 + C42}{C2}$$

is to remain constant while $\epsilon$ changes, C2 too must depend on the dielectric constant ($\epsilon$·C41, C42, cf. page 5).

If the capacitor C2 is assumed to be made up of two capacitors in parallel, we have $$C2 = \epsilon \cdot C21 + C22 \quad (2)$$

C21 being the capacitance of a capacitor with air for a dielectric, which then is immersed in the same liquid as C41. In order to maintain capacitance constant, a capacitor with fixed capacitance value, C22, is assumed to be connected parallel to $\epsilon$C21.

This results in $$\frac{C4}{C2} = \frac{\epsilon C41 + C42}{\epsilon C21 + C22}, \text{ where } \frac{C4}{C2} \text{ is to be constant.}$$

Thus $$\frac{d\frac{C4}{C2}}{d\epsilon} = \frac{C41 \cdot (\epsilon C21 + C22) - C21 \cdot (\epsilon C41 + C42)}{(\epsilon \cdot C21 + C22)^2} = 0$$

$$\frac{d\frac{C4}{C2}}{d\epsilon} = \frac{C22 \cdot C41 - C21 \cdot C42}{(\epsilon C21 + C22)^2} = 0$$

resulting in $$C22 \cdot C41 = C21 \cdot C42 \quad (3)$$

This means, if C22 equals (C21·C42/C41), neither (C4/C2) nor Ua will change with a change in $\epsilon$.

Thus a change in the dielectric constant can be compensated such that it will not affect the output signal corresponding to a certain liquid level in the vessel 1.

Furthermore, the requirement of constant sensitivity (dUa/D1) is to be met, regardless of a change of the dielectric constant of the liquid to be measured.

Figure 3:
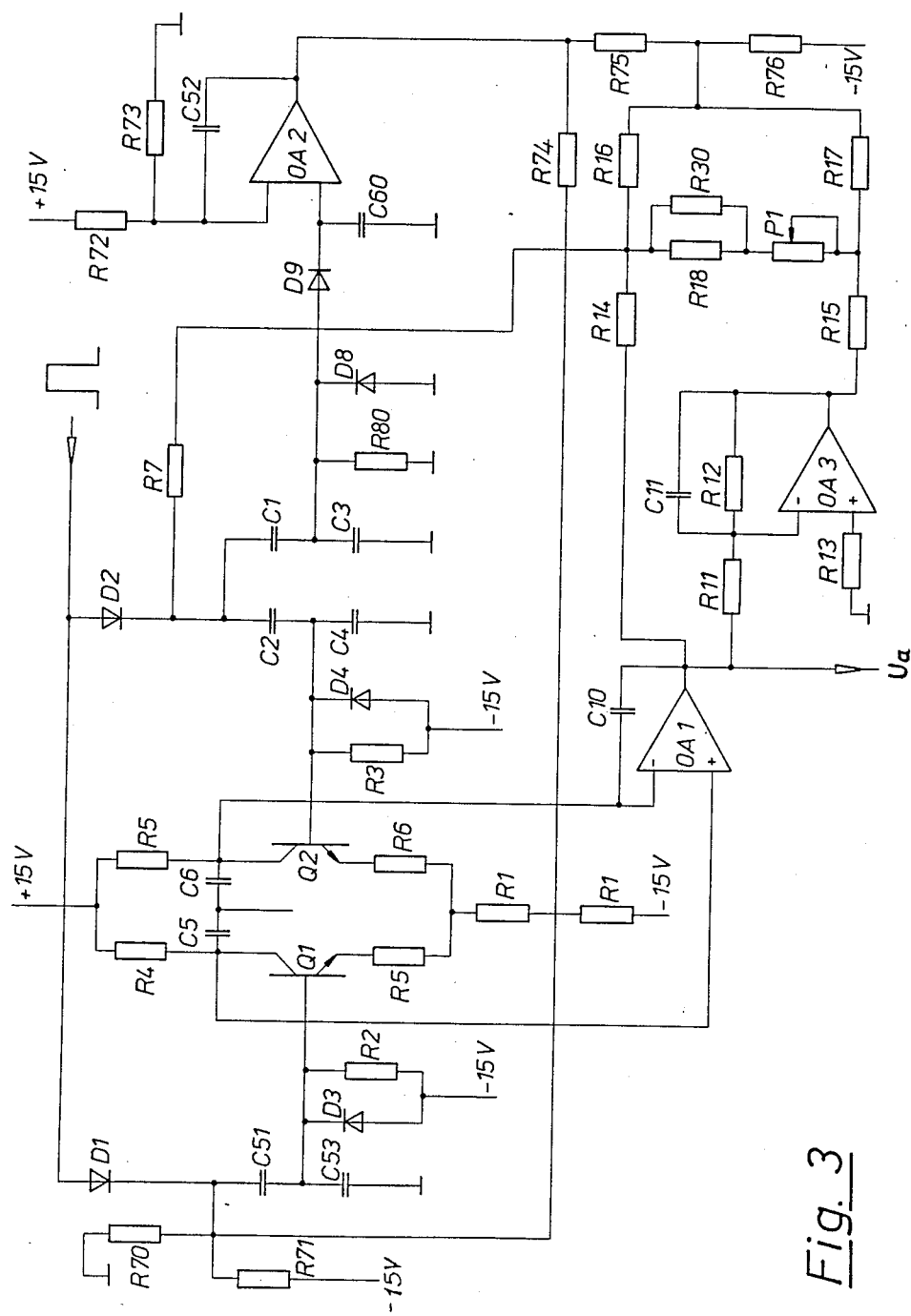
Figure 4:
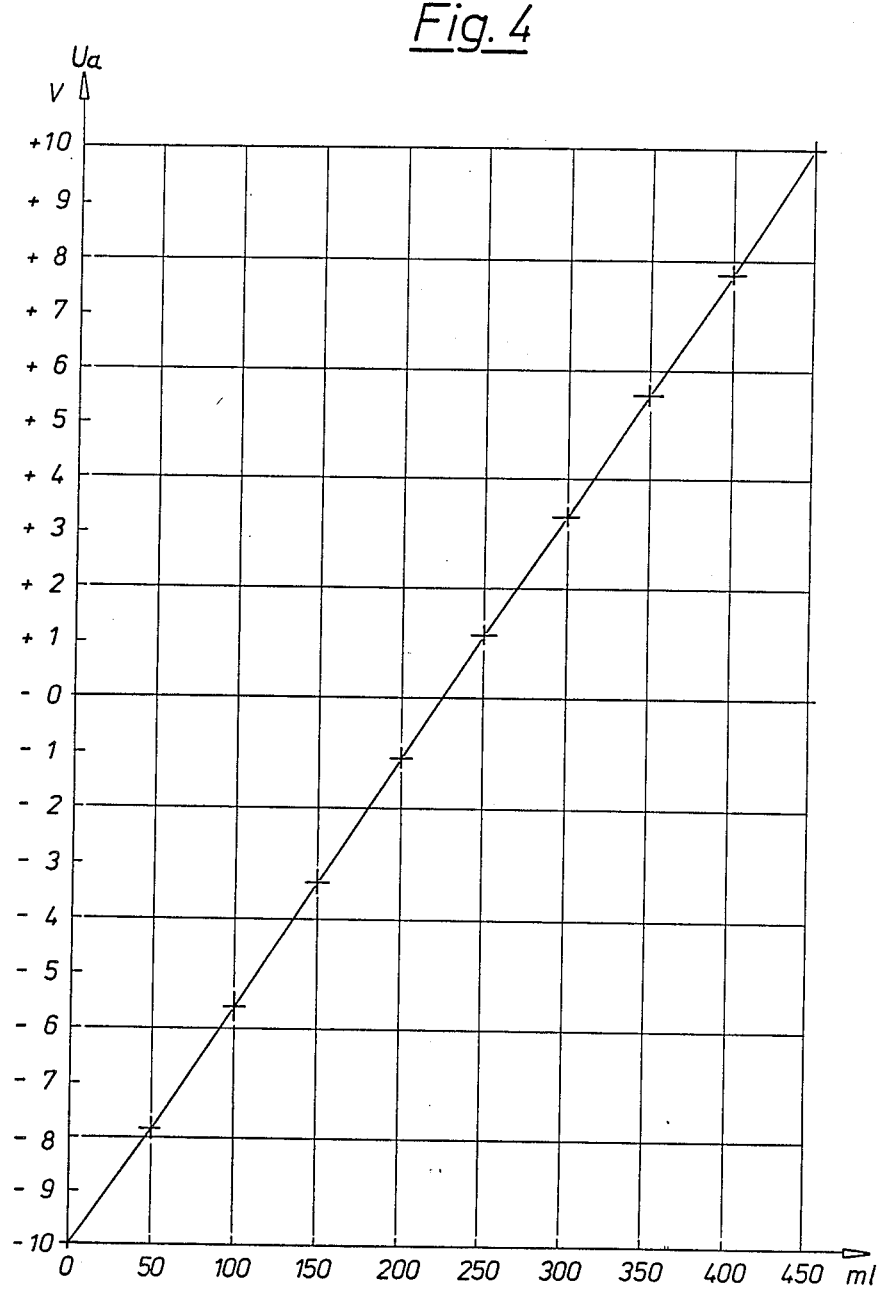

The electrodes 5, 6, 9, which are made from metal, preferably stainless steel, form the following capacitors, as can be seen from FIG. 3:

Capacitor C1 . . . driver electrode 5 against compensating electrode 6;
Capacitor C2 . . . driver electrode 5 against sensor electrode 3 plus cylindrical piece 4;
Capacitor C3 . . . compensator electrode 6 against wall 1 plus shield 8;

Capacitor C4 ... sensor electrode 3 plus cylindrical pieced 4 against wall 1 plus shield 8;
Capacitor C5 ... driver electrode 5 against wall 1 plus shield 8;
Capacitor C6 ... sensor electrode 3 plus cylindrical piece 4 against compensating electrode 6.

With the exception of C4 these capacitors, or rather their electrodes, are continuously and completely covered by the liquid to be measured.

The capacitors C1, C2, C3, C4 are essential for the operation of the device, while C5, C6 are parasitic capacitances and need only be taken into account in the measuring of the other capacitances.

In the circuit according to FIG. 3 the capacitor C2 together with the capacitor C4 forms one arm of a capacitive bridge. The driver electrode 5 is supplied with square-wave pulses, and the amplitude of the pulses appearing at the sensor electrode 3 depends on the ratio of the capacitances of the capacitors C4 and C2. The capacitance of part of the capacitor C2 ($\epsilon$C21) depends on the dielectric constant $\epsilon$ of the liquid but is constant at a constant temperature and for a given liquid, for instance fuel. The dielectric of C4 is part air, part liquid, and—for a given liquid and constant temperature—the value of C4 depends only on the liquid level L. The ratio between the capacitance of capacitor C4 and the liquid level L is linear in the range of levels considered.

The series circuit established by capacitors C1 and C3 forms a capacitive voltage divider, which is subject to the same square-wave pulse as the capacitors C2 and C4. The capacitor C3 is provided with a shunt resistor R80 with a resistance value lower than the impedance of capacitor C3, the pulse current through the resistor R80 being virtually independent of capacitor C3 and only dependent on capacitor C1. The capacitance of capacitor C1 will change with the dielectric constant of the liquid; as described above, its $\epsilon$-dependent pulse current is used for conpensation of the $\epsilon$-values depending on the type of liquid and on temperature.

The output Ua of the electronic circuit varies linearly with the liquid level L within an accuracy of 0.1%, but this linearity will only hold within a given level range.

Using a shield 8 as shown in FIG. 1 will extend the range of linearity to lower values.

By confirming the measuring vessel 1 as shown in FIG. 1 and by using an evaluation circuit according to FIG. 3 it is possible to render the sensitivity of the device independent of the dielectric constant of the liquid to be measured. This is due to the following circumstances.

A change of the liquid level L in the measuring vessel will entail a change of (C4/C2)

Differentiation of the transfer function of the evaluation circuit as shown in FIG. 2 results in $$\frac{dUa}{dC4} = -\frac{n(L-m)}{bC2} \quad (4)$$

Here the capacitance value of the capacitor C4 is a function of the liquid level. The capacitance value of the capacitor C2 on the other hand will not change with a change in liquid level in the vessel 1, as the electrode 5 constituting capacitor C2 is always completely immersed in the liquid to be measured, and the value of $\epsilon$C21 will not change as a consequence.

As mentioned above, the capacitance C22, which together with $\epsilon$C21 makes up the actual value of the capacitance of capacitor C2, has a fixed value. Thus the output voltage Ua varies linearly with the capacitance of capacitor C4, which in turn is a function f=f(L) of the liquid level in the measuring vessel.

We now write $$C4 = \epsilon C43 + C44 \quad (5)$$

C43 being the capacitance of that part of the sensor electrode 3 which is surrounded by liquid, and C44 being the capacitance of that part of the sensor electrode 3 which is surrounded by air. With a rising liquid level $\epsilon$C43 also increases and C44 decreases, the sum of C43+C44 remaining constant, as this sum is given by the capacitance of the sensor when vessel 1 is empty.

This can be written as $$C43 + C44 = a,$$

a measurable constant $$C44 = a - C43 \quad (6)$$

which, combined with formula (5), results in $$C4 = C43(\epsilon - 1) + a \quad (7)$$

Furthermore, $$(dC43/dL) = m \quad (8)$$

m being the capacitance per unit of length of the sensor electrode 3 in air.

Integration results in $$C43 = mL + n \quad (9)$$

and the formulae (7) and (9) combined will give $$C4 = (mL + C41) - (\epsilon - 1) + a \quad (10)$$

The capacitance C4 is linearly dependent on the liquid level L in the vessel 1, the slope of this relationship depending on the dielectric constant of the liquid to be measured.

This dependency is compensated by a suitable configuration of the evaluation circuit, which contains a compensating circuit C1, C3, R80, D8, D9, C60, OA2 plus additional circuitry and a resistor network, this compensating circuit being parallel-connected to the bridge arm containing the variable capacitor C4. In addition, the feedback loop contains an active element.

The compensating circuit contains a series-circuit of the capacitor C1 and the capacitor C3, C1 being formed by the electrodes 5 and 6, which always are completely covered by the liquid to be measured, while the capacitor C3 is formed by the compensating electrode 6 and the wall 8 plus shield electrode 9, all of which always are completely covered by the liquid—this series circuit being connected parallel to the bridge arm containing capacitors C2 and C4, of which the capacitance of the latter varies with the liquid level in vessel 1.

As can be seen from FIG. 3, the voltage drop across resistor R80, which is produced by the pulse current of the auxiliary voltage source flowing through capacitors C1 and C3 and the resistor R80, is being rectified by diode D9 and smoothed by capacitor C60, and then applied to the input of a differential amplifier OA2 serving as an inverter, whose second input is supplied with a reference voltage by the voltage divider R72, R73. The feedback capacitor C52 of the differential amplifier OA2 serves only to dampen possible HF oscillations.

The output signal of the differential amplifier OA2 is applied to the bridge arms C51, C53 and C2, C4 via the resistors R74 or R75, R16, R7, and influences the bridge feeding pulse. As the capacitor C1 is completely immersed in the liquid its capacitance changes if the dielectric constant of the liquid changes. This in turn leads to a change in the input voltage of the differential amplifier OA2 and further to a change in its output voltage, resulting in a compensation of the change in the dielectric constant. The current flowing through the capacitor C1 is used to control the amplitude of the pulse feeding the bridge network in such a way that $$(dU_a/dL)$$

is kept constant despite a change in the dielectric constant $\epsilon$ of the liquid.

This aim is attained by means of a resistor network R75, R76, R16, R17, R18, R15, R30 and the potentiometer P1; the resistor network being connected to a fixed voltage of $-15$ V and—via a further operational amplifier OA3 also acting as an inverter and being provided with a capacitor C11 in order to dampen HF oscillations, and via a resistor R11—to the output voltage Ua. The operational amplifier OA3 will furthermore permit large voltage jumps at the positive slope of the input pulse, thus enabling a high sensitivity of the evaluation circuit to be attained.

By means of the resistor network R14 through R18 and R30 and the potentiometer P1 it is possible to adjust the sensitivity without changing the conditions in the initial state of the circuit, especially the potentials e1 and e2. A suitable choice of the values of resistors R74, R75 and R76 will also enable the potentials e1 and e2 to be adjusted to a desired value, for instance 7.5 V.

In a preferred embodiment of the measuring vessel according to the invention the cylindrical wall 8 is made from stainless steel and has an interior diameter of 80 mm and a length of 270 mm.

The bottom 2 is made of plastic and the sensor electrode 3 is a rigid wire of stainless steel with a diameter of 3 mm.

The cylindrical piece 4 is attached to the sensor electrode 3 and has a diameter of 12 mm and a length of 25 mm.

The annular driver electrode 5 and the likewise annular compensating electrode 6 are made from stainless steel and have a length of 30 mm and a wall thickness of 1.5 mm each, the diameter of the driver electrode 5 being 16 mm and that of the compensating electrode 6 being 40 mm.

The shield electrode 9 is configured as a sheet metal disk having a hole with a diameter of 16 mm through which the sensor electrode 3 passes, and is attached to the wall 8 and connected to ground via this wall.

As a matter of principle the electrodes need not be made from stainless steel as indicated above. This is recommended only in view of the aggressiveness of certain liquids, e.g. some fuels, but a suitable protection against corrosion may also be achieved by selecting other corrosion-proof materials, such as diverse aluminium alloys, or by applying protective coatings to materials which are not corrosion-resistant by themselves. Suitable coatings for this purpose may be metallic or non-metallic, i.e. varnishes.

I claim:

1. A level measuring device to measure the level of an electrically non-conductive liquid in a vessel comprising a sensor electrode which is coaxially positioned in said vessel and is partly immersed in said non-conductive liquid, forming together with the wall of said vessel a capacitor that is connected to an evaluation circuit measuring the capacitance of said capacitor, said capacitance providing a measure for said liquid level in said vessel to be determined, taking into account a compensating electrode also located in said vessel, wherein a driver electrode is placed in the lower area of said vessel at a position essentially coaxial to said sensor electrode, and wherein said compensating electrode is positioned between said driver electrode and said wall of said vessel, the two electrodes constituting further capacitors in conjunction with each other, and with said sensor electrode, and with said wall of said vessel.

2. A level measuring device according to claim 1, wherein a shielding electrode is provided above said driver electrode and said compensating electrode, which is electrically connected to said wall of said vessel and is placed at a position normal to said sensor electrode by which it is pierced without touching.

3. A level measuring device according to claim 1, further comprising an evaluation circuit which is configured as a capacitive measuring transducer whose capacitance, which is formed by said sensor electrode and said wall of said vessel, is part of a capacitive bridge having two bridge arms and said bridge arms each having a pair of capacitors, and in which the connecting points of each pair of capacitors forming each bridge arm are each connected to an amplifier, whose outputs in turn are connected to a differential amplifier—two circuit elements, each comprising a diode or a transistor, each being series-connected to each of said two bridge-arms, and the two circuit elements being interconnected with each other and connected to an auxiliary voltage source on one side, and at least one of said circuit elements being connected to both said bridge arm and, via passive current-limiting elements, to an output of said differential amplifier on its other side, whereas the other side of the second circuit element is connected to said second bridge arm and, via passive current-limiting elements, to a fixed potential or a second differential output of said differential amplifier—, wherein the second capacitor of the bridge arm containing the capacitor formed by said sensor electrode and said wall of said vessel, is formed by said driver electrode of said vessel and said sensor electrode, whereas the other bridge arm is formed by fixed capacitors.

4. A level measuring device according to claim 3, wherein two capacitors in series are parallel-connected to said bridge arm constituted by the vessel and its sensor and driver electrodes, which capacitors are formed by said driver electrode and said compensating electrode, and the compensating electrode and said wall of said vessel, a resistor being parallel-connected to the latter capacitor, and a compensating circuit being connected at the connecting point of the two capacitors of the series circuit and the resistor, whose output acts upon the auxiliary voltage source feeding said bridge arms and supplying square-wave pulses.

5. A level measuring device according to claim 4, wherein said compensating circuit has a comparator, one of whose inputs is connected via a diode to the connecting point of the two series-connected capacitors which are parallel-connected to one of the bridge arms, with the additional use of a smoothing capacitor at this input, while the other input of said comparator is connected to a referernce potential, and the output of said comparator is connected via resistors to the connecting points of the circuit elements and said bridge arms, and a feedback circuit between the compensating circuit output and said bridge arms.

* * * * *